US006377785B1

(12) United States Patent
Ogino (10) Patent No.: US 6,377,785 B1
(45) Date of Patent: Apr. 23, 2002

(54) PORTABLE TELEPHONE SET AND COMMUNICATIONS SYSTEM INCORPORATING SAME

(75) Inventor: Tooru Ogino, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/287,586

(22) Filed: Apr. 6, 1999

(30) Foreign Application Priority Data

Apr. 8, 1998 (JP) .......................................... 10-095887

(51) Int. Cl.[7] .............................................. H04Q 11/12
(52) U.S. Cl. .................... 455/127; 455/552; 455/69; 455/550
(58) Field of Search ................................ 455/127, 522, 455/69, 70, 126, 550, 575, 572

(56) References Cited

U.S. PATENT DOCUMENTS

| 5,152,007 A | | 9/1992 | Uribe |
| 5,555,447 A | * | 9/1996 | Kotzin et al. .................. 455/72 |
| 6,185,431 B1 | * | 2/2001 | Li et al. ...................... 455/522 |
| 6,208,846 B1 | * | 3/2001 | Chen et al. .................. 455/127 |

FOREIGN PATENT DOCUMENTS

| EP | 0 586 170 | 3/1994 |
| EP | 0 853 391 | 7/1998 |
| GB | 2 258 370 | 2/1993 |
| JP | 7-221700 | 8/1995 |
| JP | 7-226710 | 8/1995 |

* cited by examiner

Primary Examiner—Doris H. To
(74) Attorney, Agent, or Firm—Young & Thompson (57) ABSTRACT

A portable telephone set controls the amplification factor of an amplifier to control the transmission power of the portable telephone set based on a control signal transmitted from the base station. If the control signal transmitted from the base station controls the transmission power so as to be equal to or smaller than a predetermined level, then a first switching means sets the amplifier to an ON-state. If the control signal transmitted from the base station controls the transmission power so as to be greater than the predetermined level, then the first switching means sets the amplifier to an OFF-state. While the amplifier is being set to the OFF-state by the first switching means, if the amplifier is set to the ON-state by a second switching means only when the user of the portable telephone set communicates via the portable telephone set, then the amplifier is in the ON-state only during the communication if the transmission power is controlled so as to exceed the predetermined level.

9 Claims, 6 Drawing Sheets

| Items | Parameters | Alternative Candidates |
|---|---|---|
| Bandwidth | 1.25 / 5 / 10 / 20 MHz | |
| Chip rate | 1.024 / 4.096 / 8.192 / 16.384 Mcps | |
| Frame structure | Duration 10 ms<br>16 slots (0.625 ms x 16) | |
| Modulation | Data, Spreading : QPSK (BPSK) | DPDCH/DPCCH multiplexing |
| Multi-rate | Variable spreading and/or multicode | |
| Channel coding | Convolutional (R=1/3 or 1/2, K=7), RS(R=9/10) | Turbo code |
| Spreading | Short code + Long code | |

PORTABLE TELEPHONE SET AND COMMUNICATIONS SYSTEM INCORPORATING SAME

BACKGROUND OF THE INVENTION

1. Field of the Invention

The present invention relates to a portable telephone set which is subject to transmission power control, and a communications system incorporating such a portable telephone set.

2. Description of the Related Art

In a communication system which employs a code division multiple access (CDMA) process for radio communications, a number of base stations and mobile stations communicate with each other in respective established links at the same frequency. The received power (desired power) of a signal in a certain link acts as interference power that disturbs other links. In an uplink transmission where a mobile station transmits a signal and a base station receives the transmitted signal, when the desired power exceeds a predetermined power level, the interference power increases, thus reducing the link capacity.

To prevent the above phenomenon from occurring, it is necessary to strictly control the transmission power of mobile stations. According to one uplink transmission power control process, the desired power from a mobile station is measured by a base station and the measured level of the desired power is compared with a control target level. If the measured level of the desired power is greater than the control target level, then the base station transmits a control command for reducing the transmission power to the mobile station. Conversely, if the measured level of the desired power is smaller than the control target level, then the base station transmits a control command for increasing the transmission power to the mobile station. The mobile station receives the control command transmitted from the base station, and controls the transmission power based on the received control command.

Figure 1:
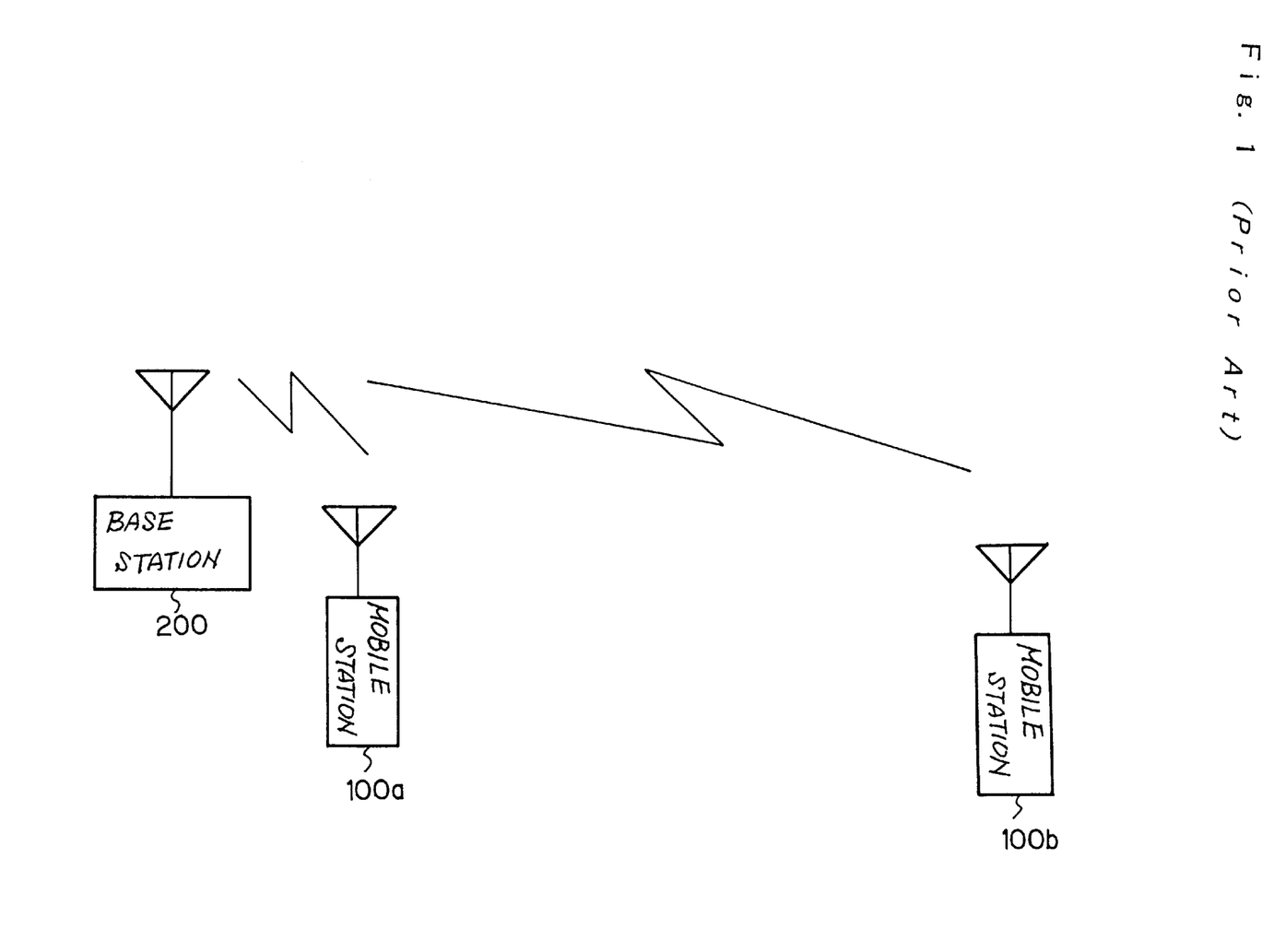
FIG. 1 is a block diagram illustrative of a process of controlling the transmission power of a mobile station based on a control signal from a base station.

FIG. 1 of the accompanying drawings illustrates a process of controlling the transmission power of a mobile station based on a control signal from a base station.

As shown in FIG. 1, a mobile station 100a is positioned more closely to a base station 200 than a mobile station 100b. It is general practice to control the transmission power of the mobile station 100b so as to be greater than the transmission power of the mobile station 100a. Therefore, the mobile station 100b positioned more remotely from the base station 200 than the mobile station 100a consumes an increased current, causes a greater battery power consumption, and suffers a shorter communication time.

One solution has been to turn off a transmission power amplifier in a mobile station while no communication is made by the mobile station, for thereby preventing a current consumed by the mobile station from being increased.

Figure 2:
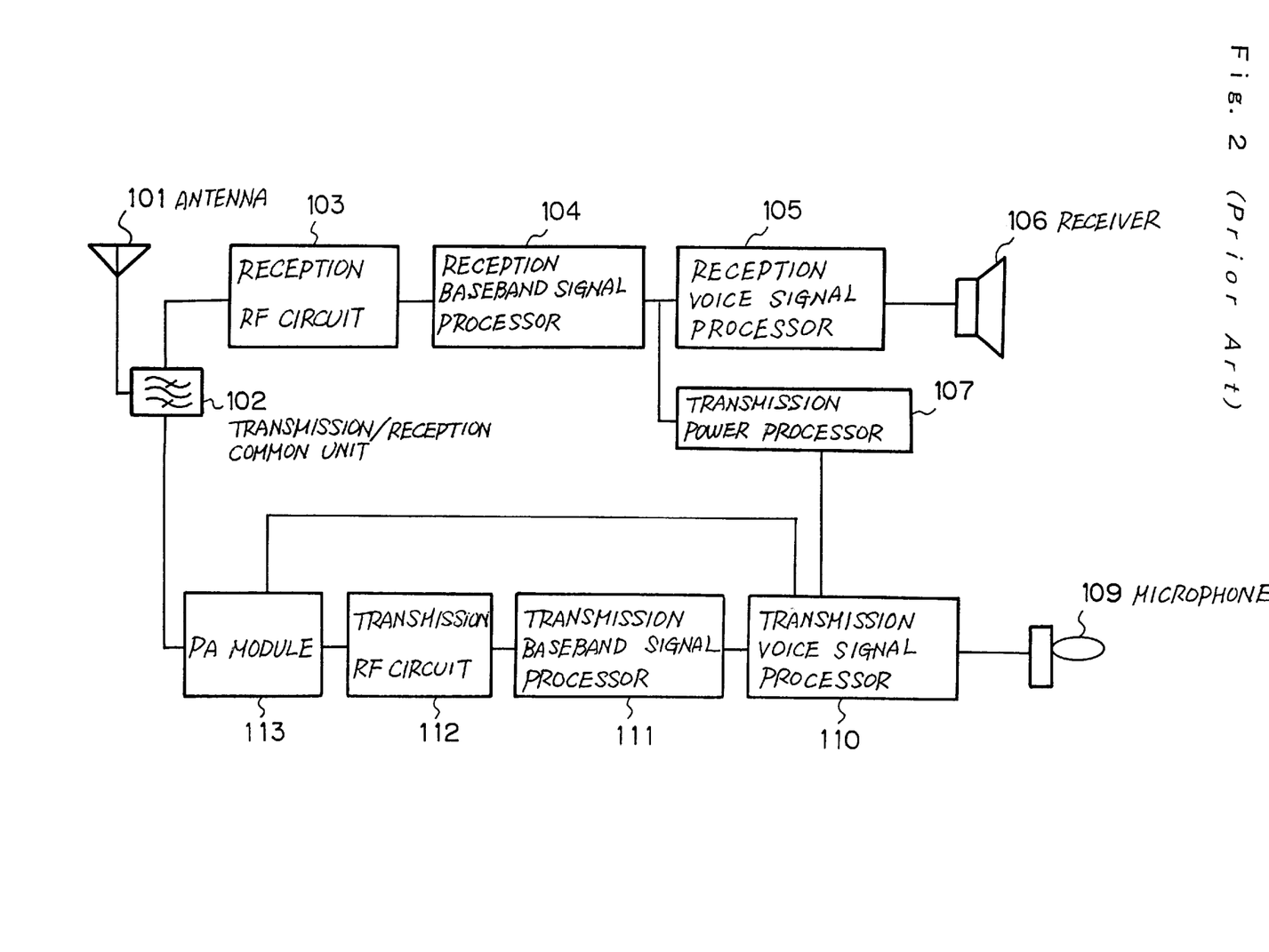
FIG. 2 is a block diagram of a conventional portable telephone set.

A conventional portable telephone set which incorporates a scheme for achieving such a solution is illustrated in FIG. 2 of the accompanying drawings.

As shown in FIG. 2, the system comprises an antenna 101 for transmitting and receiving radio waves, a reception RF circuit 103 for spreading a radio signal received by the antenna 101 with a predetermined code, a reception baseband signal processor 104 for decoding the signal spread by the reception RF circuit 103, a reception voice signal processor 105 for converting the signal decoded by the reception baseband signal processor 104 into an analog signal, a receiver 106 for outputting the analog signal produced by the reception voice signal processor 105 as voice sounds, a transmission power processor 107 for processing a control signal for controlling transmission power which is contained in the signal decoded by the reception baseband signal processor 104, a microphone 109 for receiving and converting voice sounds into a voice signal, a transmission voice signal processor 110 for converting the voice signal from the microphone 109 into a digital signal, and controlling transmission power based on the control signal processed by the transmission power processor 107, a transmission baseband signal processor 111 for encoding the digital signal produced by the transmission voice signal processor 110, a transmission RF circuit 112 for converting the signal encoded by the transmission baseband signal processor 111 into a high-frequency signal, a PA module 113 for amplifying the power of the high-frequency signal produced by the transmission RF circuit 112 according to an amplification factor controlled by the transmission voice signal processor 110, and a transmission/reception common unit 102 for outputting the radio signal received by the antenna 101 to the reception RF circuit 103 and outputting the signal whose power has been amplified by the PA module 113 to the antenna 101. The signal whose power has been amplified by the PA module 113 and which has been outputted from the transmission/reception common unit 102 is radiated from the antenna 101.

The transmission power is amplified on the basis of the control signal processed by the transmission power processor 107. The control signal processed by the transmission power processor 107 is supplied to the transmission voice signal processor 110. Only when a voice signal is supplied from the microphone 109 to the transmission voice signal processor 110, the PA module 113 amplifies the transmission power according to the amplification factor controlled by the transmission voice signal processor 110.

In the portable telephone set shown in FIG. 2, a signal transmitted from a base station (not shown) is received by the antenna 101, and processed successively by the transmission/reception common unit 102, the reception RF circuit 103, the reception baseband signal processor 104, the reception voice signal processor 105, and the receiver 106, which outputs voice sounds. The base station also transmits a control signal for controlling the transmission power of the portable telephone set. The control signal is processed by the transmission power processor 107, and then supplied to the transmission voice signal processor 110.

A voice signal supplied from the microphone 109 is processed successively by the transmission voice signal processor 110, the transmission baseband signal processor 111, the transmission RF circuit 112, the PA module 113, and the transmission/reception common unit 102, and transmitted from the antenna 101 to the base station. The amplification factor of the PA module 113 is controlled by the transmission voice signal processor 110 based on the control signal processed by the transmission power processor 107. Only when a voice signal is supplied from the microphone 109 to the transmission voice signal processor 110, the PA module 113 amplifies the transmission power.

Even if the portable telephone set has a function to be able to turn off the transmission power amplifier when no communication is made by the mobile station, the user of the portable telephone set often fails to recognize such a function. Provided the user recognizes the function, the user tends to communicate via the portable telephone set normally without having any idea as to when and if the transmission power amplifier is turned off. Therefore, there is almost no time in which the transmission power amplifier would be turned off.

When the conventional portable telephone set is positioned remotely from the base station, the portable telephone set consumes a larger current, causes a greater battery power consumption, and suffers a shorter communication time.

SUMMARY OF THE INVENTION

It is therefore an object of the present invention to provide a portable telephone set which minimizes an increase in a current consumed thereby and has an increased communication time when the portable telephone set is positioned remotely from a base station, and a communication system which incorporates such a portable telephone set.

According to the present invention, a portable telephone set controls the amplification factor of an amplifier to control the transmission power of the portable telephone set based on a control signal transmitted from the base station. If the control signal transmitted from the base station controls the transmission power so as to be equal to or smaller than a predetermined level, then a first switching means sets the amplifier to an ON-state. If the control signal transmitted from the base station controls the transmission power so as to be greater than the predetermined level, then the first switching means sets the amplifier to an OFF-state.

While the amplifier is being set to the OFF-state by the first switching means, if the amplifier is set to the ON-state by a second switching means only when the user of the portable telephone set communicates via the portable telephone set, then the amplifier is in the ON-state only during the communication if the transmission power is controlled so as to exceed the predetermined level.

When the portable telephone set is positioned remotely from the base station, an increase in a current consumed by the portable telephone set is minimized and a communication time is prevented from being unduly shortened.

If the portable telephone set has a memory means for temporarily storing a signal to be transmitted to the base station, then when the user turns on a communication switch to initiate a press-to-talk sequence, the communication is not interrupted because the signal stored by the memory means is read and transmitted.

The above and other objects, features, and advantages of the present invention will become apparent from the following description when taken in conjunction with the accompanying drawings which illustrate a preferred embodiment of the present invention by way of example.

DETAILED DESCRIPTION OF THE PREFERRED EMBODIMENTS

Figure 3:
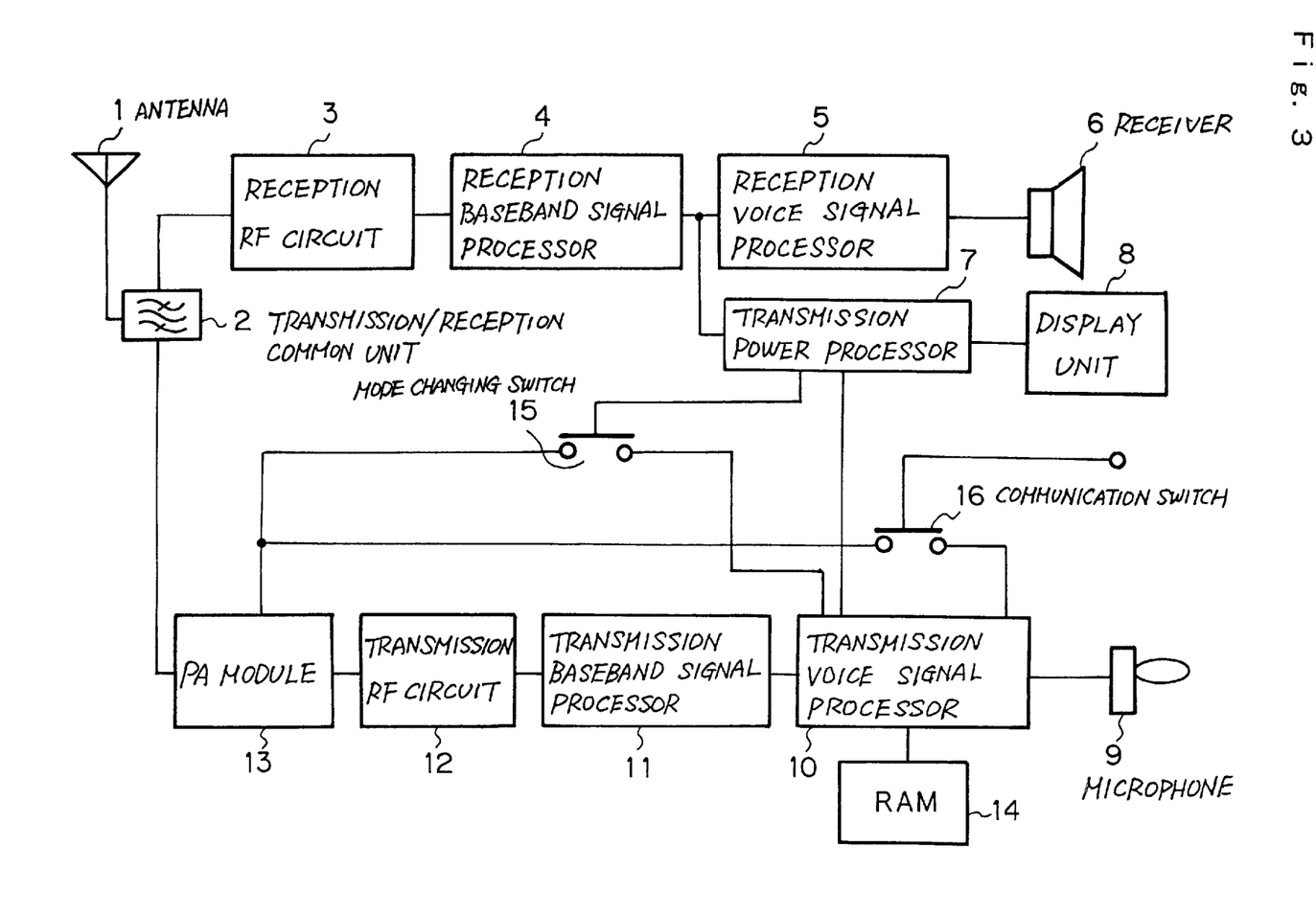
FIG. 3 is a block diagram of a portable telephone set according to the present invention.

As shown in FIG. 3, a portable telephone set according to the present invention comprises an antenna 1 for transmitting and receiving radio waves, a reception RF circuit 3 for spreading a radio signal received by the antenna 1 with a predetermined code, a reception baseband signal processor 4 for decoding the signal spread by the reception RF circuit 3, a reception voice signal processor 5 for converting the signal decoded by the reception baseband signal processor 4 into an analog signal, a receiver 6 for outputting the analog signal produced by the reception voice signal processor 5 as voice sounds, a transmission power processor 7 for processing a control signal for controlling transmission power which is contained in the signal decoded by the reception baseband signal processor 4, a display unit 8 as display means for displaying the control signal processed by the transmission power processor 7, a microphone 9 for receiving and converting voice sounds into a voice signal, a transmission voice signal processor 10 for converting the voice signal from the microphone 9 into a digital signal, and controlling transmission power based on the control signal processed by the transmission power processor 7, a transmission baseband signal processor 11 for encoding the digital signal produced by the transmission voice signal processor 10, a transmission RF circuit 12 for converting the signal encoded by the transmission baseband signal processor 11 into a high-frequency signal, a PA module 13 as amplifying means for amplifying the power of the high-frequency signal produced by the transmission RF circuit 12 according to an amplification factor controlled by the transmission voice signal processor 10, a transmission/reception common unit 2 for outputting the radio signal received by the antenna 1 to the reception RF circuit 3 and outputting the signal whose power has been amplified by the PA module 13 to the antenna 1, a RAM 14 as memory means for temporarily storing the digital signal produced by the transmission voice signal processor 10, a mode changing switch 15 as first switching means for switching between ON- and OFF-states of the PA module 13 based on the control signal processed by the transmission power processor 7, and a communication switch 16 as second switching means for switching between ON- and OFF-states of the PA module 13 under the control of the user of the portable telephone set. The signal whose power has been amplified by the PA module 13 and which has been outputted from the transmission/reception common unit 2 is radiated from the antenna 1.

The mode changing switch 15 has its ON- and OFF-states controlled by the control signal processed by the transmission power processor 7. If the transmission power is equal to or smaller than a predetermined level based on the control signal processed by the transmission power processor 7, then the mode changing switch 15 is set to the ON-state. If the transmission power is greater than the predetermined level based on the control signal processed by the transmission power processor 7, then the mode changing switch 15 is set to the OFF-state.

The amplification factor of the PA module 13 is controlled by the transmission voice signal processor 10 based on the control signal processed by the transmission power processor 7.

Operation of the portable telephone set of the above structure will be described below.

Figure 4A:
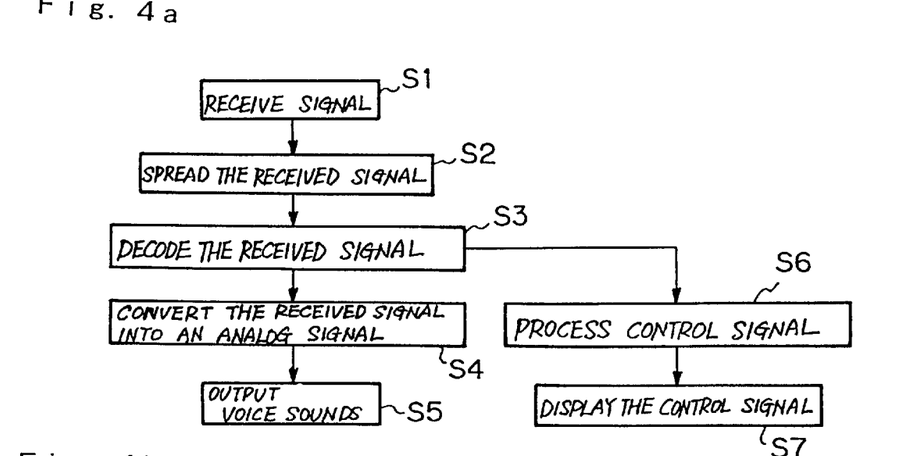
FIG. 4a is a flowchart of an operation sequence of the portable telephone set shown in FIG. 3 when the portable telephone set receives a signal.

First, an operation sequence of the portable telephone set when the portable telephone set receives a signal will be described below with reference to FIG. 4a.

When a signal transmitted from the base station is received by the antenna 1 at step S1, the received signal is supplied from the antenna 1 via the transmission/reception common unit 2 to the reception RF circuit 3, which spreads the received signal at step S2.

Then, the reception baseband signal processor 4 decodes the signal spread by the reception RF circuit 3 at step S3.

The reception voice signal processor 5 converts the signal decoded by the reception baseband signal processor 4 into an analog signal at step S4.

Thereafter, the receiver 6 outputs the analog signal produced by the reception voice signal processor 5 as voice sounds at step S5.

The signal decoded by the reception baseband signal processor 4 contains a control signal which has been transmitted from the base station to control the transmission power of the portable telephone set. The control signal is supplied to and processed by the transmission power processor 7 at step S6.

Thereafter, the control signal processed by the transmission power processor 7 is supplied to and displayed on the display unit 8 at step S7.

Figure 4B:
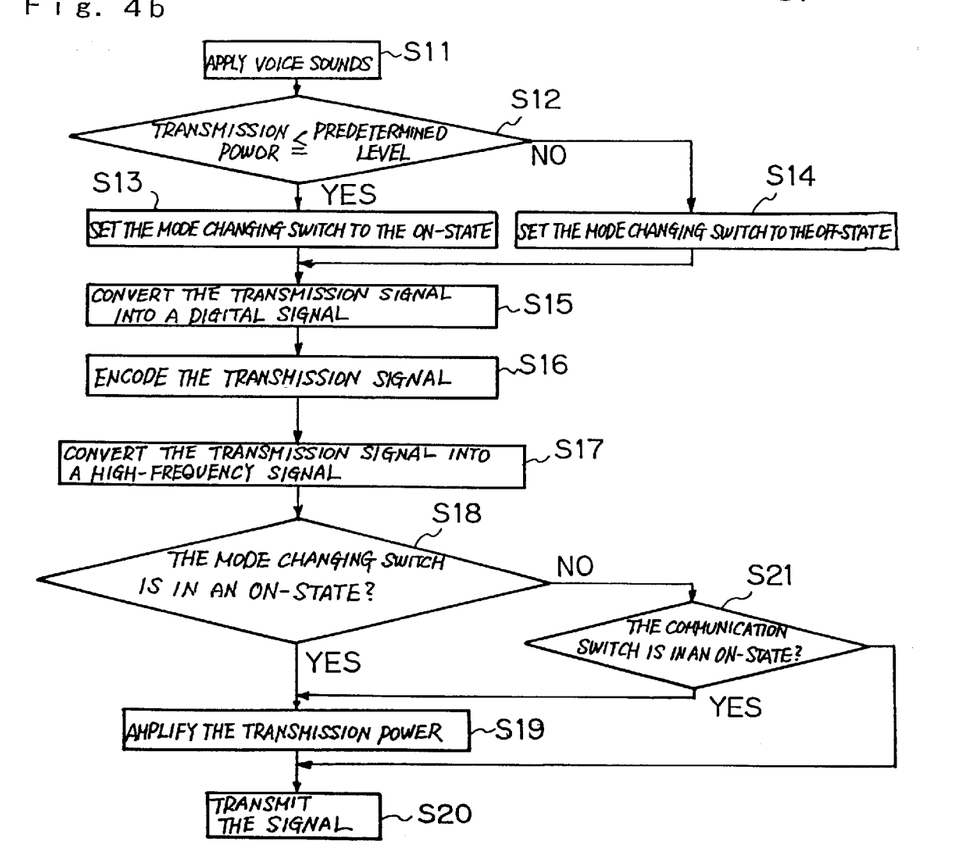
FIG. 4b is a flowchart of an operation sequence of the portable telephone set shown in FIG. 3 when the portable telephone set transmits a signal.

Next, an operation sequence of the portable telephone set when the portable telephone set transmits a signal will be described below with reference to FIG. 4b.

When voice sounds are applied to the microphone 9 and a voice signal is produced by the microphone 9 at step S11, it is decided at step S12 whether or not the transmission power is equal to or lower than a predetermined level on the basis of the control signal which has been processed by the transmission power processor 7 and displayed on the display unit 8. If the transmission power is equal to or lower than the predetermined level, then the transmission power processor 7 sets the mode changing switch 15 to the ON-state at step S13.

If the transmission power is greater than the predetermined level, then the transmission power processor 7 sets the mode changing switch 15 to the OFF-state at step S14.

After step S13 or S14, the transmission voice signal processor 10 converts the voice signal from the microphone 9 into a digital signal at step S15.

Then, the transmission baseband signal processor 11 encodes the digital signal produced by the transmission voice signal processor 10 at step S16.

Then, the transmission RF circuit 12 converts the signal encoded by the transmission baseband signal processor 11 into a high-frequency signal at step S17.

It is decided at step S18 whether the mode changing switch 15 is in the ON-state or not. If the mode changing switch 15 is in the ON-state, then the PA module 13 amplifies the power of the high-frequency signal produced by the transmission RF circuit 12 according to an amplification factor which has been determined by the transmission voice signal processor 10 based on the control signal processed by the transmission power processor 7 at step S19.

If the mode changing switch 15 is in the OFF-state, then it is decided at step S21 whether the communication switch 16 is in an ON-state or not. If the communication switch 16 is in the ON-state, then control goes to step S19.

Thereafter, the high-frequency signal whose power has been amplified by the PA module 13 is transmitted via the transmission/reception common unit 2 and the antenna 1 to the base station at step S20.

If the communication switch 16 is in the OFF-state, then the PA module 13 is turned off, and the power of the high-frequency signal to be transmitted is not amplified.

The communication switch 16 is controlled by the user. The user decides whether the transmission power is equal to or smaller than or greater than the predetermined level based on the control signal which has been processed by the transmission power processor 7 and displayed on the display unit 8. If the transmission power is greater than the predetermined level, then the user sets the communication switch 16 to the ON-state only when the user is to communicate via the portable telephone set.

Figure 5:
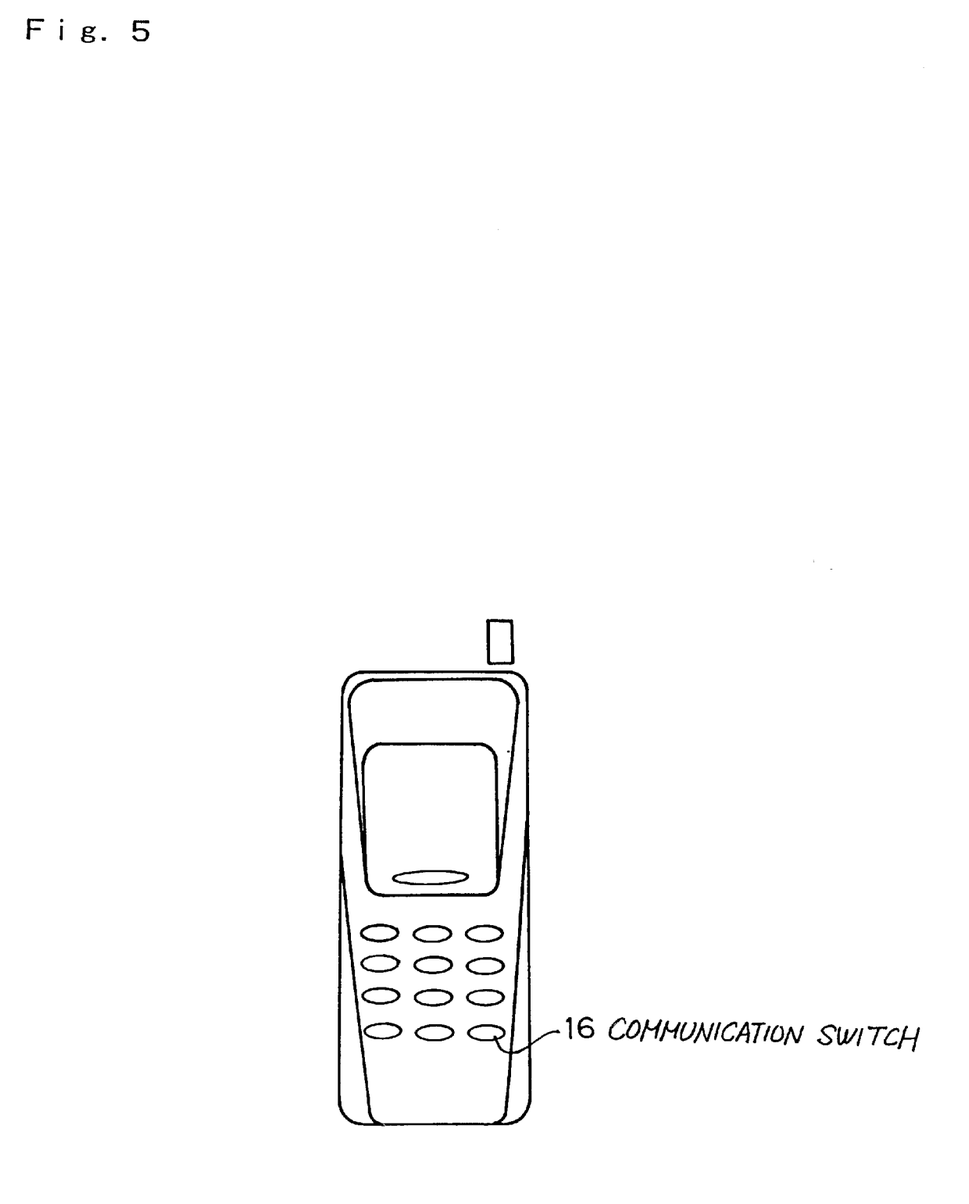
FIG. 5 is a front view of the portable telephone set shown in FIG. 3.

As shown in FIG. 5, the communication switch 16 may be installed as a push-button switch on an outer control panel of the portable telephone set.

If the push-button switch as the communication switch 16 is used by the user to initiate a press-to-talk sequence, then when the user turns on and off the communication switch 16, the communication tends to be interrupted at its start.

In the illustrated embodiment, when the mode changing switch 15 is set to the OFF-state, the digital signal produced by the transmission voice signal processor 10 is stored in the RAM 14 for 1 second at all times, overwriting any digital signal data previously stored for more than 1 second. When the communication switch 16 is set to the ON-state, the 1-second digital signal data stored in the RAM 14 is read at a rate slightly higher than a normal communication rate, which will be recovered within a few seconds.

In the illustrated embodiment, the display unit 8 displays the control signal processed by the transmission power processor 7. However, the display unit 8 may display a message indicating to the user that the communication switch 16 does not need to be operated if the control signal controls the transmission power so as to be equal to or less than the predetermined level, and may display a message prompting the user to operate the communication switch 16 if the control signal controls the transmission power so as to be greater than the predetermined level.

The predetermined level for the transmission power may be arbitrarily established. If the predetermined level is set to a lower level, then the user can control the transmission power more often by operating the communication switch 16, for thereby reducing the power consumption of the portable telephone set.

The portable telephone set according to the present invention can be used in a wideband CDMA (W-CDMA) communication system.

Figure 6:
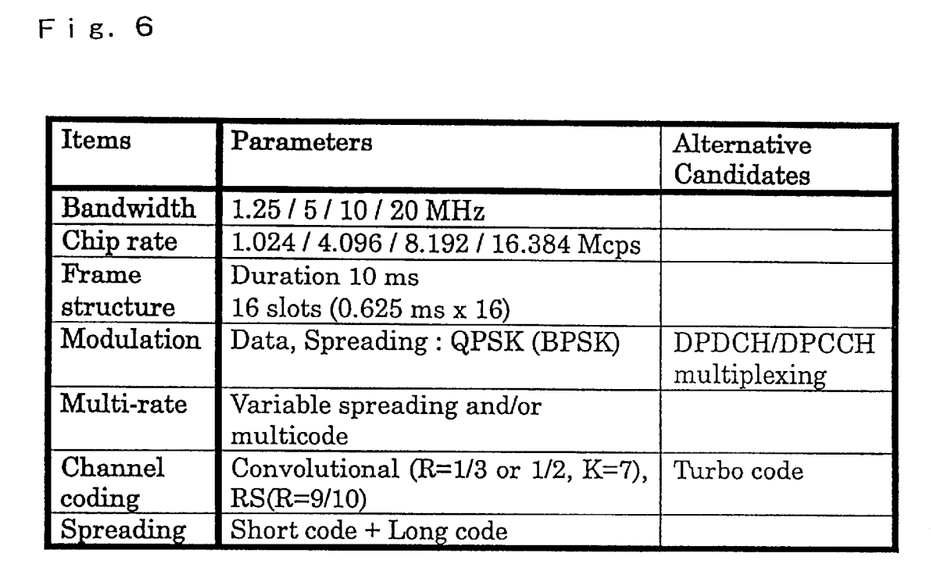
FIG. 6 is a diagram showing major specifications of a W-CDMA system.

As shown in FIG. 6, the W-CDMA communication system has bandwidths of 1.25/5/10/20 MHz, chip rates of 1.024/4.096/8.192/16.384 Mcps, a frame structure having a duration of 10 ms and composed of 16 slots, a QPSK modulation scheme, a multirate represented by variable spreading and/or multicode, a convolutional channel coding, and a combination of short and long codes for signal spreading.

Although a certain preferred embodiment of the present invention has been shown and described in detail, it should be understood that various changes and modifications may be made therein without departing from the scope of the appended claims.

What is claimed is:

1. A portable telephone set comprising:

amplifying means for amplifying transmission power based on a control signal transmitted from a base station;

first switching means for switching between ON- and OFF-states of said amplifying means based on said control signal;

second switching means for switching between ON- and OFF-states of said amplifying means based on an external operative action;

said first switching means comprising means for setting said amplifying means to the ON-state if said control signal controls said transmission power so as to be equal to or smaller than a predetermined level, and setting said amplifying means to the OFF-state if said control signal controls said transmission power so as to be greater than said predetermine level;

said second switching means comprising means for turning on and off said amplifying means when said first switching means sets said amplifying means to the OFF-state; and display means for displaying contents of said control signal, said display means comprising means for displaying a message indicating that said second switching means does not need to be operated if said control signal controls the transmission power so as to be equal to or less than the predetermined level, and displaying a message to operate said second switching means if said control signal controls the transmission power so as to be greater than the predetermined level.

2. A portable telephone set according to claim 1, wherein said second switching means comprises a push-button switch.

3. A communication system which incorporates a portable telephone set according to claim 2, having bandwidths of 1.25 MHz, 5 MHz, 10 MHz, and 20 MHz, chip rates of 1.024 Mcps, 4.096 Mcps, 8.192 Mcps, and 16.384 Mcps, a frame structure having a duration of 10 ms and composed of 16 slots, a QPSK modulation scheme, a multirate represented by variable spreading and/or multicode, a convolutional channel coding, and a combination of short and long codes for signal spreading.

4. A portable telephone set according to claim 2, further comprising memory means for temporarily storing a signal to be transmitted to said base station.

5. A communication system which incorporates a portable telephone set according to claim 4, having bandwidths of 1.25 MHz, 5 MHz, 10 MHz, and 20 MHz, chip rates of 1.024 Mcps, 4.096 Mcps, 8.192 Mcps, and 16.384 Mcps, a frame structure having a duration of 10 ms and composed of 16 slots, a QPSK modulation scheme, a multirate represented by variable spreading and/or multicode, a convolutional channel coding, and a combination of short and long codes for signal spreading.

6. A portable telephone set according to claim 4, further comprising means for reading the signal stored in said memory means at a rate higher than a rate at which the signal has been stored in said memory means.

7. A communication system which incorporates a portable telephone set according to claim 6, having bandwidths of 1.25 MHz, 5 MHz, 10 MHz, and 20 MHz, chip rates of 1.024 Mcps, 4.096 Mcps, 8.192 Mcps, and 16.384 Mcps, a frame structure having a duration of 10 ms and composed of 16 slots, a QPSK modulation scheme, a multirate represented by variable spreading and/or multicode, a convolutional channel coding, and a combination of short and long codes for signal spreading.

8. A communication system which incorporates a portable telephone set according to claim 1, having bandwidths of 1.25 MHz, 5 MHz, 10 MHz, and 20 MHz, chip rates of 1.024 Mcps, 4.096 Mcps, 8.192 Mcps, and 16.384 Mcps, a frame structure having a duration of 10 ms and composed of 16 slots, a QPSK modulation scheme, a multirate represented by variable spreading and/or multicode, a convolutional channel coding, and a combination of short and long codes for signal spreading.

9. A portable telephone set comprising:
an amplifier to amplify transmission power based on a control signal transmitted from a base station;
a first switch to switch between ON- and OFF-states of said amplifier based on said control signal;
a display to display contents of said control signal; and
a second switch to switch between ON- and OFF-states of said amplifier based on said display displaying a message indicating that said second switch does not need to be operated if said control signal controls the transmission power so as to be equal to or less than a predetermined level, and displays a message to operate said second switch if said control signal controls the transmission power so as to be greater than said predetermined level.

* * * * *